Oct. 18, 1955  E. J. SCHAEFER  2,721,105
THRUST BEARING
Filed May 21, 1953  2 Sheets-Sheet 2
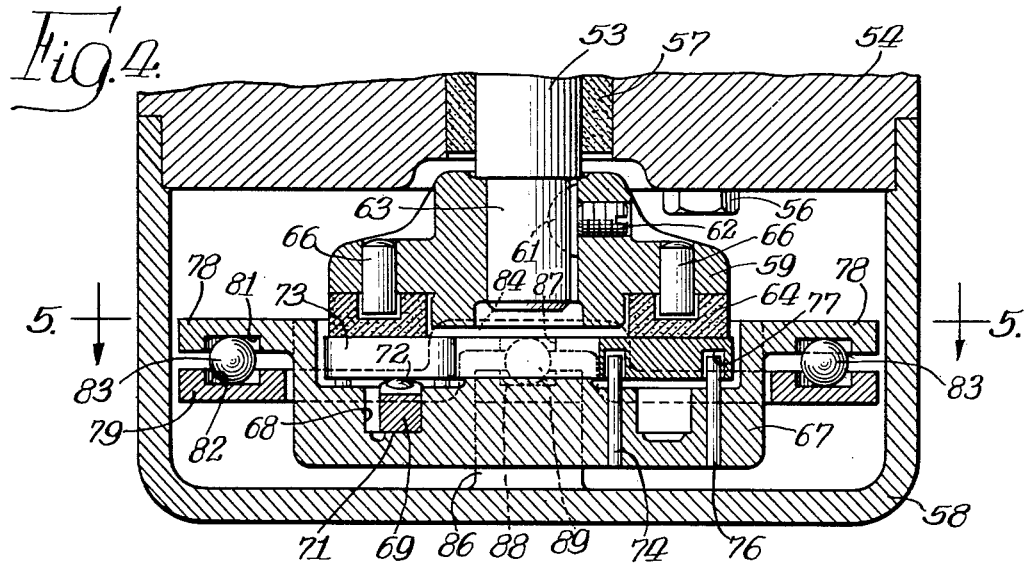
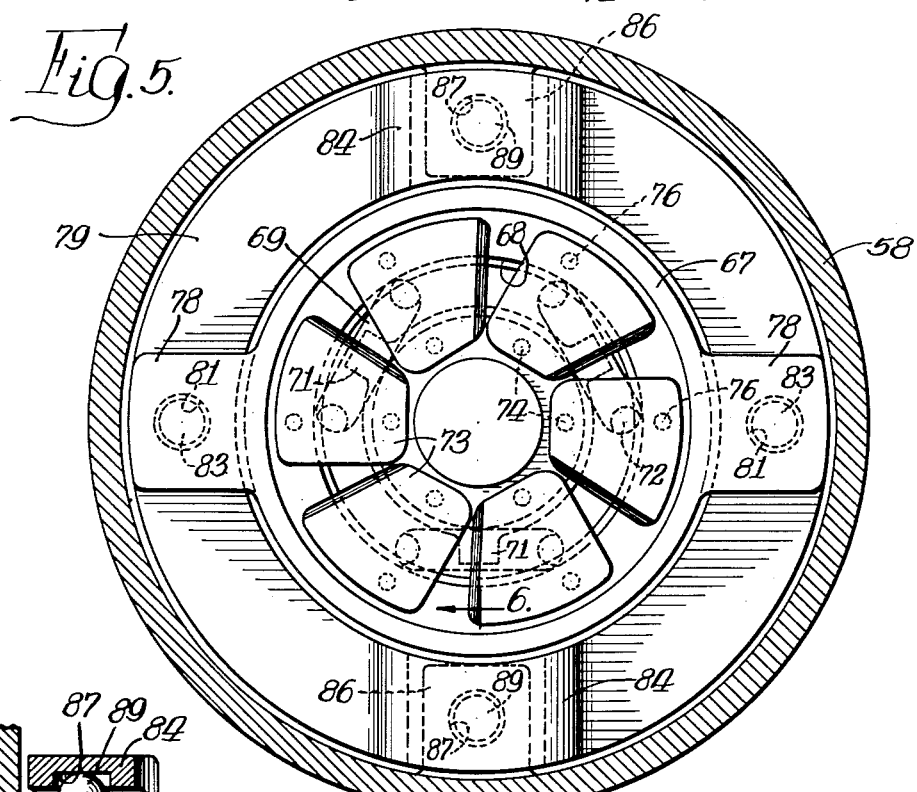
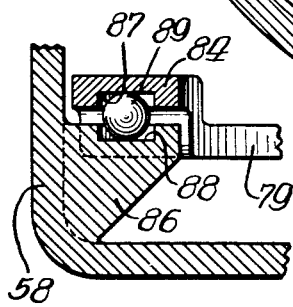
INVENTOR.
Edward J. Schaefer
BY
Davis Lindsey Hibben + Noyes
Atty's.

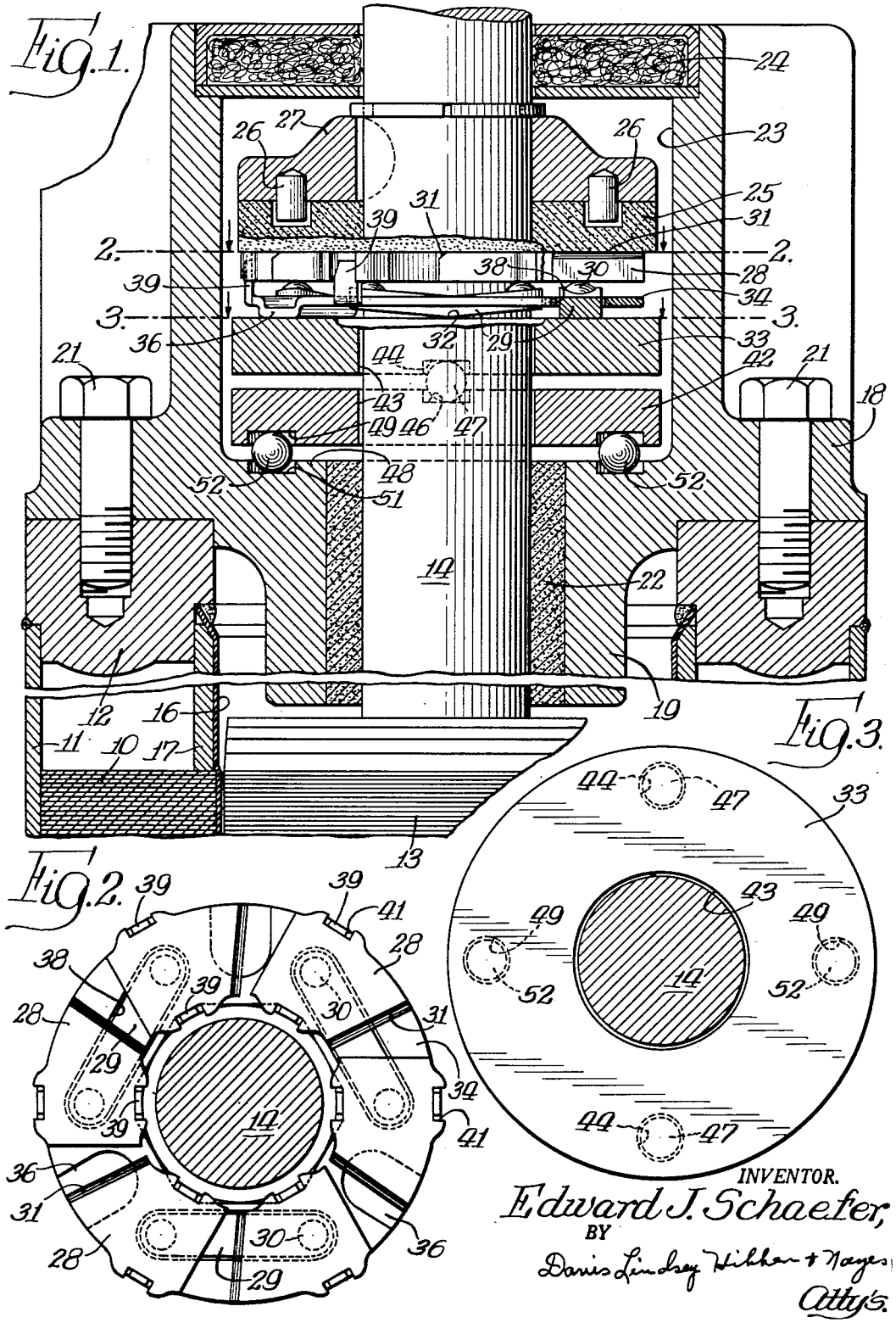

United States Patent Office 2,721,105
Patented Oct. 18, 1955

2,721,105

THRUST BEARING

Edward J. Schaefer, Fort Wayne, Ind.

Application May 21, 1953, Serial No. 356,539

5 Claims. (Cl. 308—160)

This invention relates to an improved thrust bearing of the Kingsbury type and more particularly to a novel and improved means for equally distributing thrust pressure in a bearing of this character.

As described in my copending application Serial No. 280,705, filed April 5, 1952, the conventional Kingsbury thrust bearing constructions, although satisfactory for use with oil lubrication, have been found to be inadequate in the case of a water lubricated thrust bearing such as used in a submersible motor in which water is allowed to enter the interior of the motor. Moreover, with the bearing constructions heretofore known, a high degree of precision and uniformity in the manufacture of the bearing segments and supports has been necessary thereby greatly increasing the cost of such bearings.

In my copending application Serial No. 280,705, I have described and claimed a novel and relatively inexpensive bearing construction which operates successfully with water lubrication and is adapted particularly for use as a lower thrust bearing in conjunction with a vertical shaft. This construction utilizes a leveling disk having substantially only a central pivotal support with a rocker arm and bearing segment assembly directly or operatively supported on the disk at only three spaced points. Such an arrangement permits substantially perfect equalization of thrust pressure without requiring expensive precision made parts and with only water lubrication. The present invention is directed to a modification of the central pivot feature which is not limited to use in a bearing located below the lower end of a vertical shaft and which has the further advantage of minimizing undesirable oscillation of the segment assembly during thrust equalizing movement of the assembly.

Accordingly, a primary object of the present invention is to provide a novel and improved thrust bearing of the Kingsbury type which is capable of satisfactory use with water as the lubricating medium and which can be used as either an upper or lower thrust bearing on a vertical shaft.

A further object of the invention is to provide a novel bearing of the foregoing character which is relatively inexpensive to manufacture and does not require precision made parts.

Another object of the invention is to provide a novel bearing of the foregoing character which substantially eliminates or at least greatly minimizes oscillation of the bearing segment assembly.

Other objects and advantages of the invention will become evident from the subsequent detailed description taken in conjunction with the accompanying drawings wherein:

Fig. 1 is a vertical sectional view of the upper end portion of a submersible motor showing one embodiment of the thrust bearing comprising my invention;

Fig. 2 is a transverse sectional view taken along the line 2—2 of Fig. 1;

Fig. 3 is a transverse sectional view taken along the line 3—3 of Fig. 1;

Fig. 4 is a vertical sectional view of the lower end portion of a submersible motor showing a different embodiment of the invention;

Fig. 5 is a transverse sectional view taken along the line 5—5 of Fig. 4; and

Fig. 6 is a fragmentary vertical sectional view taken along the line 6—6 of Fig. 5.

Referring first to Figs. 1-3 of the drawings, the reference numeral 10 designates the stator of a motor of the submersible type in which water is permitted to enter the interior of the motor. The stator 10 is enclosed by an outer casing 11 and an end member 12. A rotor 13 carried on a rotor shaft 14 is mounted within the stator 10, and the interior of the stator 10 is sealed by a thin sleeve 16 extending between the rotor and the stator so that the stator windings are protected from water. The thin liner or sleeve 16 extends upwardly from the stator 10 along a spacer sleeve 17 and is suitably sealed, as by welding, to the end member 12. At the upper end of the motor, a cap 18 having an axially extending tubular portion 19 is secured to the end member 12 by means of a plurality of screws 21. A radial bearing 22 of graphite is mounted within the tubular portion 19 and surrounds the shaft 14. An axial recess 23 in the upper end of the cap 18 houses an upper thrust bearing structure, described below, and permits access of water as a lubricant through a filter 24 to the shaft 14 and the radial bearing 22.

The thrust bearing includes a graphite disk 25 mounted around the shaft 14 and loosely held for rotation with the shaft by means of a plurality of pins 26 depending from a collar 27 keyed to the shaft. The lower face of the disk 25 constitutes one of the thrust bearing surfaces. The coacting non-rotating thrust surface is provided by a plurality of metal segments or shoes 28 which are disposed in pairs at the opposite ends of a plurality of rocker arms 29, three such rocker arms and six such segments being shown in this instance. The end of each rocker arm 29 is formed with a rounded bump or projection 30 for rockably or tiltably supporting the corresponding segment 28. As is customary in thrust bearings of this general type, the leading edge, indicated at 31 (Figs. 1 and 2) of each segment 28 is slightly slanted or beveled so that during operation water is literally dragged or forced in between each segment 28 and the coacting disk 25 to provide a lubricating film therebetween. The rockable supports 30 for the segments 28 permit the latter to tilt or rock as required in response to the wedging action or pressure of the film of water. For permitting automatic alignment and leveling between the individual segments 28 of each pair of segments, the rocker arms 29 are each bent at their mid-points, as seen at 32 in Fig. 1, and the mid-point is pivotally supported on an upper annular member or washer 33. Thus, by rocking movement of the arms 29 on the washer 33, accurate alignment of the individual segments 28 in groups of two is realized.

The rocker arms 29 and the washer 33 are retained in assembled relation by means of an annular cage 34, having a plurality of peripherally spaced depressed portions 36 which are secured, as by welding, to the washer 33 and serve to space the body portion of the cage axially from the underlying washer. The annular body portion of the cage 34 is formed with elongated slots 38 in which the rocker arms 29 loosely fit with the mid-points 32 of the arms extending below the slots 38 into contact with the washer 33 and the ends of the arms 29 projecting above the slots 38. The inner and outer peripheries of the annular cage 34 are provided with a plurality of upturned prongs 39 which interfit loosely with corresponding notches 41 (Fig. 2) formed in the segments 28 for holding the latter in place on the rounded rocker arm supports 30. Thus, each segment 28 is retained in place by a pair of oppositely disposed prongs 39.

For permitting automatic alignment and pressure equalization between each of the three rocker arms 29, I provide an arrangement which is the equivalent of a central pivotal support for the washer 33. For this purpose, the washer 33 is mounted directly over and coaxially with a lower annular member or washer 42, both the washers 33 and 42 having central apertures 43 somewhat larger than the diameter of the shaft 14 in order to permit limited tilting movement of the washers relative to the shaft. The adjacent surfaces of the washers 33 and 42 are provided with complementary pairs of cavities 44 and 46, respectively, whereby to define a pair of ball-receiving recesses having disposed therein a pair of pivot balls 47. The complementary recesses 44—46 and the pivot balls 47 are disposed in diametrically opposed positions on opposite sides of the shaft 14, and the recesses 44—46 are slightly larger than the balls 47 in order to permit limited tilting movement of the upper washer 33 relative to the lower washer 42 and on a diametrically extending axis between the pair of balls 47. In addition, the recessed relation of the balls 47 relative to the enlarged cavities 44—46 serves to prevent relative rotation between the washers 33 and 42.

The underside of the lower washer 42 and the adjacent surface of a shoulder portion 48 at the inner end of the tubular portion 19 of the cap 18 are likewise provided with oppositely disposed pairs of complementary recesses 49 and 51, respectively, for receiving a second pair of pivot balls 52 which are identical with the pivot balls 47. However, the recesses 49—51 and the pivot balls 52 contained therein are oriented at 90° relative to the pivot balls 47. The recesses 49—51 are likewise slightly larger than the balls 52 so that the washer 42 can undergo limited tilting movement relative to the rigid support provided by the shoulder 48 and on a diametrically extending axis between the balls 52 at right angles to the axis of tilting movement of the washer 33. Also, the coaction of the recesses 49—51 with the balls 52 prevents rotation of the washer 42 relative to the shoulder 48 so that the entire leveling arrangement comprising the washers 33 and 42 and the rocker arm and bearing segment assembly mounted thereon is held against rotary movement.

Thus, it will be seen that by a combination of two pairs of diametrically opposed pivot balls oriented at a 90° angle between the respective pairs of balls, the upper washer 33 can undergo universal tilting movement relative to an equivalent central pivot in order to assume automatically the position necessary for complete leveling of the rocker arm and bearing segment assembly with consequent perfect equalization of thrust pressure between the plurality of bearing segments 28. The combination of only three rocker arms 29 supported on a leveling washer 33 universally tiltable about a central pivot point permits the realization of this objective with water lubrication and without the necessity of precision made parts. The pivot balls 47 and 52 can be readily obtained with a high degree of uniformity and thus constitute a vast improvement over the knife edge pivots heretofore suggested. At the same time the contact surface at the points of pivotal movement is held to an absolute minimum so as to avoid excessive frictional resistance. Thus, the present arrangement is in marked contrast to the previous leveling arrangements in oil lubricated Kingsbury type bearing wherein the seating area of the leveling element is in the form of a relatively large spherically curved annulus in which frictional resistance is so great that water lubricated operation is impossible.

In the embodiment of the invention just described in connection with Figs. 1 to 3, it will be understood that the equivalent pivot point lies on the axis of the vertical shaft 14 and somewhere between the diametric axes between the respective pairs of pivot balls 47 and 52. Thus, the equivalent pivot point, while relatively close to the assembly of bearing segments 28, is still disposed somewhat below the contact or running surfaces of the segments 28. This condition inherently gives rise to a phenomenon which may be designated for convenience as oscillation of the segment assembly about its center. In other words, as long as the equivalent pivot point for the upper leveling washer 33 is below the running surfaces of the segments 28 there will necessarily be a certain degree of lateral and vertical shifting or oscillation of the center point of the segment assembly as the washer 33 tilts to effect leveling and equalization of thrust pressure. The degree of oscillation of the segment assembly for any given angle of tilt of the washer 33 will necessarily be greater as the equivalent pivot point for the leveling washer is disposed at a greater distance below the running surface of the segment assembly. Consequently, in order to substantially eliminate or at least greatly minimize this undesirable oscillation of the bearing segment assembly about its center, it is highly desirable to locate the central pivot point for the leveling support as close as possible to the plane of the segment surfaces and preferably substantially in the same plane with the segment surfaces. This result is achieved by the construction illustrated in Figs. 4 to 6 of the drawings.

This embodiment of the invention is illustrated in conjunction with a lower thrust bearing mounted at the lower end of a rotor shaft 53 projecting through an end member 54 which is clamped to the bottom of a stack of stator laminations (not shown) by a plurality of screws 56. A radial graphite bearing 57 is disposed around the shaft 53 above the thrust bearing, and an end bell or housing 58 is secured to the end member 54 and provides a chamber for the thrust bearing and its leveling mechanism. A thrust collar 59 is secured by means of a key 61 and a set screw 62 to a reduced extension 63 provided at the lower end of the shaft 53. The collar 59 thus rotates with the shaft 53, and a graphite disk or ring 64 comprising the rotatable thrust bearing member is connected to the collar 59 for rotation therewith by means of a plurality of pins 66.

A cup-shaped leveling member 67 is disposed below the rotatable thrust bearing member 64 and is provided with an annular groove or channel 68 in the base thereof. A plurality of bent rocker arms 69, three being preferably provided as shown in the drawing, are disposed more or less tangentially in the channel 68 with their mid-points being rockably seated on suitable flats 71 elevated slightly from the base of the channel and spaced circumferentially therearound. The opposite ends of the rocker arms 69 are formed with rounded projections 72 for rockably or tiltably supporting a plurality of metal bearing segments 73 in generally the same manner as hereinbefore described in connection with Figs. 1 to 3. The segments 73 are retained in position on the supports 72 by means of a pair of oppositely disposed inner and outer pins 74 and 76, respectively, which extend upwardly from the base of the cup-shaped member 67 on both sides of the annular channel 68 and fit loosely within corresponding sockets or openings 77 at the underside of each segment.

For tiltably supporting the cup member 67, a pair of diametrically opposed arms 78 extend radially outwardly from the upper edge of the cup 67 and overlie an annular member or ring 79 which is supported coaxially with the cup 67. As will be evident from Fig. 4, the cup member 67 depends downwardly through the central opening of the ring 79 and in concentric relation therewith. The adjacent surfaces of the cup arms 78 and the annular member 79 are formed with complementary pairs of enlarged cavities 81 and 82, respectively, for receiving a pair of pivot balls 83. As in the pivot ball arrangement heretofore described in connection with the first embodiment of the invention, the ball-receiving recesses defined by the cavities 81—82 are slightly larger than the balls 83 so as to permit limited tilting movement of the cup member 67 along the axis of the arms 78 and the pivot balls 83.

The annular member 79 is formed with a pair of integral upwardly bulged or elevated portions 84 (Fig. 6) which are disposed in substantially the same plane as the arms 78 and are located at diametrically opposite positions at a 90° orientation relative to the arms 78. A pair of projections 86 extend rigidly from the housing 58 which are received within the upwardly bulged portions 84 of the annular member 79, as best seen in Fig. 6. The opposed surfaces of the ring portions 84 and the rigid projections or supports 86 are likewise formed with complementary pairs of cavities 87 and 88, respectively, which have a pair of pivot balls 89 received therebetween. The ball-receiving recesses 87—88 are again slightly larger than the balls 89 so as to permit limited tilting movement of the annular member 79 relative to the rigid supports 86. Inasmuch as the pivot balls 89 are oriented at 90° relative to the balls 83, it will readily be seen that the cup member 67 containing the rocker arm and bearing segment assembly can undergo universal tilting movement in the same general manner as the leveling washer 33 in the first described form of the invention. Thus, automatic leveling and perfect equalization of thrust pressure is achieved. It will be understood, of course, that the recessed relation of the pivot balls 83 and 89 within their respective cavities serves to hold the annular member 79 and the cup 67 against rotation relative to the housing 58.

As best seen in Fig. 4, the cooperating sets of pivot balls 83 and 89 are disposed in substantially the same plane in this embodiment of the invention. Furthermore, it will be seen that the arms 78 tend to tilt relative to the balls 83 and the annular member 79 tends to tilt relative to the balls 89 so that the pivotal contact points along both axes of pivotal movement of the members 67 and 79 are disposed in the same plane which is also in the plane of the contact surfaces of the bearing segments 73. Consequently, the equivalent central pivot point of the leveling assembly is disposed substantially in the plane of the bearing segment running surfaces with the highly advantageous result that there is substantially no tendency for the segment assembly to oscillate about its center in the manner hereinbefore described.

From the foregoing, it will be seen that my invention provides a relatively simple thrust bearing construction of the Kingsbury type which is not limited to use as a lower thrust bearing and in which substantially perfect pressure equalization is obtained without the necessity of impractical dimensional control and precision manufacture. In addition, the invention also provides an improved means of utilizing an equivalent central pivoting arrangement for the rocker arm and bearing segment assembly which does not involve the use of precision made knife edge pivots. Also, one embodiment of the invention affords a means of locating the equivalent central pivot point of the leveling arrangement substantially in the same plane as the bearing segment running surfaces so as to eliminate or minimize the tendency toward oscillation of the bearing segment assembly about its center.

Although the invention has been described in particular relation to certain specific structural embodiments, it will be understood that various modifications and equivalent structures may be employed without departing from the scope of the invention as defined in the appended claims.

I claim:

1. In a thrust bearing of the type described having a plurality of rockers with a plurality of bearing segments tiltably supported on said rockers, a generally cup-shaped member provided with a pair of radially extending diametrically opposed arms and having said rockers tiltably supported on the base of said cup-shaped member at only three spaced points, an annular member concentric with said cup-shaped member and disposed in opposed spaced relation with said arms, a pair of pivot balls interposed between said annular member and said arms and engaging the same for permitting tilting movement of said cup-shaped member relative to said annular member, rigid support means for said annular member, and a second pair of pivot balls oriented at 90° relative to said first named pair of pivot balls and engaging said support means and said annular member for permitting tilting movement of said annular member relative to said support means.

2. In a thrust bearing of the type described having a plurality of rockers with a plurality of bearing segments tiltably supported on said rockers, a cup member provided with a pair of radially extending diametrically opposed arms and having said rockers tiltably supported on the base of the cup member at only three spaced points, an annular member surrounding said cup member in concentric relation therewith and having depressed portions disposed below said arms and elevated portions disposed substantially in the plane of said arms, rigid support means disposed below the elevated portions of said annular member, a pair of pivot balls interposed between and engaging said arms and the depressed portions of said annular member for permitting tilting movement of said cup member relative to said annular member, and a second pair of pivot balls oriented at 90° relative to said first named pair of pivot balls and interposed between and engaging said support means and the elevated portions of said annular member for permitting tilting movement of said annular member relative to said support means.

3. In a thrust bearing of the type described, a set of three rocker arms having a plurality of bearing segments tiltably supported thereon, and pressure-equalizing means including a pair of coacting equalizing members, one of said members having said rocker arms tiltably supported thereon at only three spaced points, rigid support means for the other of said members, a pair of spaced pivot balls interposed between and engaging said members for permitting tilting movement of said one member relative to said other member, and a second pair of spaced pivot balls oriented at 90° relative to said first named pair of pivot balls and interposed between and engaging said support means and said other member for permitting tilting movement of said other member relative to said support means, the pivot surfaces of said balls being disposed in substantially a single plane and the contact surfaces of said bearing segments also being disposed substantially in said plane whereby to minimize oscillation of the segment and rocker assembly.

4. In a thrust bearing of the type described having a plurality of rockers with a plurality of bearing segments tiltably supported on said rockers, a cup member provided with a pair of radially extending diametrically opposed arms and having said rockers tiltably supported on the base thereof at only three spaced points, an annular member surrounding said cup member in concentric relation therewith and underlying said arms, said annular member having a pair of upwardly bulged portions at substantially the same elevation as said arms, a pair of rigid supports underlying said upwardly bulged portions, and two pairs of diametrically opposed pivot balls oriented at 90° relative to each other and interposed respectively between said annular member and said arms and between said upwardly bulged portions and said supports whereby to permit universal tilting movement of said cup member, the pivot surfaces of said balls being disposed in substantially a single plane and the upper surfaces of said bearing segments also being disposed substantially in said plane whereby to minimize oscillation of the segment and rocker assembly.

5. In combination, a vertical shaft, housing structure around the lower end of said shaft, a thrust bearing member secured to the lower end of said shaft and rotatable therewith, a set of three rockers having a plurality of coacting nonrotatable bearing segments tiltably supported thereon, and pressure-equalizing means for equalizing the thrust pressure among said segments and including a pair of supports projecting rigidly from said housing structure at diametrically opposite locations, an annular member disposed above said supports, a pair of pivot balls interposed between and engaging said annular member and said supports for permitting tilting movement of said annular member relative to said supports, a cup member depending through the open center of said annular member and having said rockers tiltably supported on the base thereof at only three circumferentially spaced points, a pair of diametrically opposed arms extending radially from the upper edge of said cup member and overlying said annular member at right angles to said supports, and a second pair of pivot balls oriented at 90° relative to said first named pivot balls and interposed between and engaging said arms and said annular member for permitting tilting movement of said cup member relative to said annular member.

References Cited in the file of this patent

UNITED STATES PATENTS

| | | |
|---|---|---|
| 1,378,544 | Kingsbury | May 17, 1921 |
| 2,031,337 | Spalding | Feb. 18, 1936 |

FOREIGN PATENTS

| | | |
|---|---|---|
| 957,368 | France | Feb. 17, 1950 |